United States Patent [19]
Lulham et al.

[11] Patent Number: 4,729,476
[45] Date of Patent: Mar. 8, 1988

[54] EASY OPEN SHRINKABLE LAMINATE

[75] Inventors: Cedric M. Lulham, Gray Court; George D. Wofford, Woodruff; John G. Bradfute; Steven G. Friedrich, both of Greer, all of S.C.

[73] Assignee: W.R. Grace & Co., Cryovac Div., Duncan, S.C.

[21] Appl. No.: 912,674

[22] Filed: Sep. 25, 1986

Related U.S. Application Data

[63] Continuation of Ser. No. 703,645, Feb. 21, 1985, abandoned.

[51] Int. Cl.$^4$ .................. B65D 37/00; B65D 75/20
[52] U.S. Cl. .................. 206/484.2; 206/524.2; 428/35; 428/349; 428/521
[58] Field of Search .................. 206/484, 484.2, 497, 206/819; 428/35, 349, 521; 426/129, 127, 410, 412, 415

[56] References Cited

U.S. PATENT DOCUMENTS

| | | | |
|---|---|---|---|
| 3,496,061 | 2/1970 | Freshour et al. | 428/461 |
| 3,647,485 | 3/1972 | Seiferth et al. | 426/129 |
| 3,655,503 | 4/1972 | Stanley et al. | 428/336 |
| 3,663,240 | 5/1972 | Seiferth et al. | 426/129 |
| 3,912,843 | 10/1975 | Brazier | 428/518 |
| 3,949,135 | 4/1976 | Vercauteren | 426/127 |
| 4,085,244 | 4/1978 | Stillman | 206/484 |
| 4,107,380 | 8/1978 | Wiesman | 428/349 |
| 4,178,401 | 11/1979 | Weinberg et al. | 428/35 |
| 4,183,182 | 1/1980 | Weinberg et al. | 264/22 |
| 4,247,563 | 1/1981 | Sample | 426/129 |
| 4,247,584 | 1/1981 | Widiger et al. | 428/35 |
| 4,254,169 | 3/1981 | Schroeder | 428/35 |
| 4,267,960 | 5/1981 | Lind et al. | 426/129 |
| 4,355,721 | 10/1982 | Knott, II et al. | 206/484 |
| 4,382,513 | 5/1983 | Schirmer et al. | 206/484 |
| 4,407,874 | 10/1983 | Gehrke | 206/484.2 |
| 4,501,797 | 2/1985 | Super et al. | 428/349 |
| 4,501,798 | 2/1985 | Koschak et al. | 428/349 |
| 4,521,467 | 6/1985 | Berger | 428/35 |
| 4,541,983 | 9/1985 | Hsu et al. | 428/518 |
| 4,572,854 | 2/1986 | Dallmann et al. | 428/349 |
| 4,590,106 | 5/1986 | Hsu et al. | 428/35 |
| 4,600,616 | 7/1986 | Ohya et al. | 426/127 |
| 4,615,922 | 10/1986 | Newsome et al. | 428/35 |
| 4,617,241 | 10/1986 | Mueller | 428/35 |
| 4,638,913 | 1/1987 | Howe . | |

FOREIGN PATENT DOCUMENTS 13745 8/1980 European Pat. Off. ............ 206/484
35310/80 9/1980 Japan .

OTHER PUBLICATIONS

Packaging Products 1970, pp. 3, 4, and 5.
Hygrade Canadian Pgk Nov. 15, 1977.

*Primary Examiner*—Stephen Marcus
*Attorney, Agent, or Firm*—John J. Toney; William D. Lee, Jr.; Mark B. Quatt

[57] ABSTRACT

An easily opened package suitable for food products such as ring sausage and the like includes a first web with a sealant layer of ethylene vinyl acetate copolymer and an ionomer, and a second web including a sealant layer of an ionomer. A resulting package exhibits good self-welding characteristics and seal strength, and an easily peelable seal.

7 Claims, 6 Drawing Figures

EASY OPEN SHRINKABLE LAMINATE

This application is a continuation of application Ser. No. 703,645 filed on Feb. 21, 1985, now abandoned.

BACKGROUND OF THE INVENTION

This invention relates generally to packaging and specifically to packaging laminates for food products.

It is common practice to package articles such as food products in thermoplastic films or laminates to protect the product to be packaged from abuse and exterior contamination, and to provide a convenient and durable package for transportation and sale to the end user.

Typical thermoplastic packaging films and laminates which provide the desired abuse protection and other desirable features in the finished package are usually designed to form strong heat seals when sealed together about the product. These materials, after heat sealing and vacuumization, are often difficult to open by the consumer or end user. It has therefore been desirable to have a packaging material which provides adequate protection of the product against environmental contaminants, moisture and air, and sufficiently strong heat seals to maintain the integrity of the package through the distribution channels and storage, and at the same time provide a heat seal which is easily opened i.e. easily peelable by the consumer or end user. Such an easy open feature avoids the need to tear apart the package with knife or other implements when it is desired to use the product.

It is also desirable to provide a packaging material with the above benefits and which in addition has self-welding capabilities, so that upon packaging a product such as a food product, for example in a thermoforming process, an upper and lower laminate will self-weld in contiguous areas around the product, providing a sufficiently strong adhesion between the laminates to maintain the integrity of the package and protection of the packaged product through the distribution cycle.

Of interest is U.S. Pat. No. 3,655,503 which issued to Hugh E. Stanley et al on Apr. 11, 1972. This reference shows a package of a composite, heat sealable thermoplastic film having an outer and inner layer with a relatively low interlaminar bond strength. This film is used by overwrapping about the article to be packaged; the film is then heat-sealed to itself at overlapping seams. Ionomers are suitable resins for the outer layer and inner layer. The ionomer when used as an inner layer is used in conjunction with polypropylene. The present invention, in contrast, uses two distinct webs to package an article by thermoforming or other suitable means. The Stanley patent teaches an easily opened heat seal in which the heat seal zone comprising bonded outer layers of the overlapped film is first ruptured during opening, and then delamination starts along the interface between an outer and inner layer. At the end of the heat seal zone, the outer layer is once again ruptured to complete the peeling of the package. Rupturing and delamination may occur more than once throughout the heat seal zone during opening. The reference shows only a single resin used in the outer or an inner layer, in contrast to the present application which shows a blend of resins in a first or forming web.

Also of interest is U.S. Pat. No. 4,178,401 issued to Alan S. Weinberg et al. This reference discloses a self-welding packaging film in which the inner or self-welding layer is a blend of ethylene vinyl acetate copolymers with differing melt flow indices. Blends of ionomer of low melt flow with ethylene vinly acetate copolymers with high melt flow are also disclosed, but these latter blends show poor self-weldability. An easily peelable heat seal is not shown.

Also of interest is U.S. Pat. No. 4,382,513 issued to Henry G. Schirmer et al on May 10, 1983. This patent discloses a package having a peelable heat seal wherein unoriented films are irradiated to control the bond strength of the resulting heat seal. Ionomers of ethylene and ethylene vinyl acetate copolymer are possible sealing layers of thermoplastic films used with this irradiated process.

It is an object of the present invention to provide a package which is made from materials including sealing layers of incompatible materials, thereby providing an easily opened seal.

It is a further object of the present invention to provide a package for food products which includes a first web and a second web which self-weld to each other along their contiguous surfaces.

It is a further object of the present invention to provide a package for food products which has good self-welding characteristics and good seal strength, yet is easily peelable through both the self-welded areas and fusion seal areas of the package.

SUMMARY OF THE INVENTION

The present invention relates to an easily opened package comprising a first web including a sealant layer of a blend of ethylene vinyl acetate copolymer and an ionomer; a second web including a sealant layer of an ionomer; the first and second webs being self-welded at their contiguous surfaces and enclosing a food product.

In another aspect, the subject invention is a package comprising a first and second web enclosing a food product, the first and second webs being self-welded at their contiguous surfaces, and an easily peelable feature being provided which operates by two different controlling mechanisms. The first mechanism in the self-welded area of the package involves incompatibility between the sealant layers of the first and second webs respectively. The second mechanism, in the fusion seal area, involves a delamination of the bond between an ionomer sealant layer of one of the webs, and an adjacent layer of ethylene vinyl acetate copolymer within the same web.

DESCRIPTION OF THE DRAWINGS

In the drawings which are attached hereto and made a part of this disclosure.

DEFINITIONS

Figure 1:
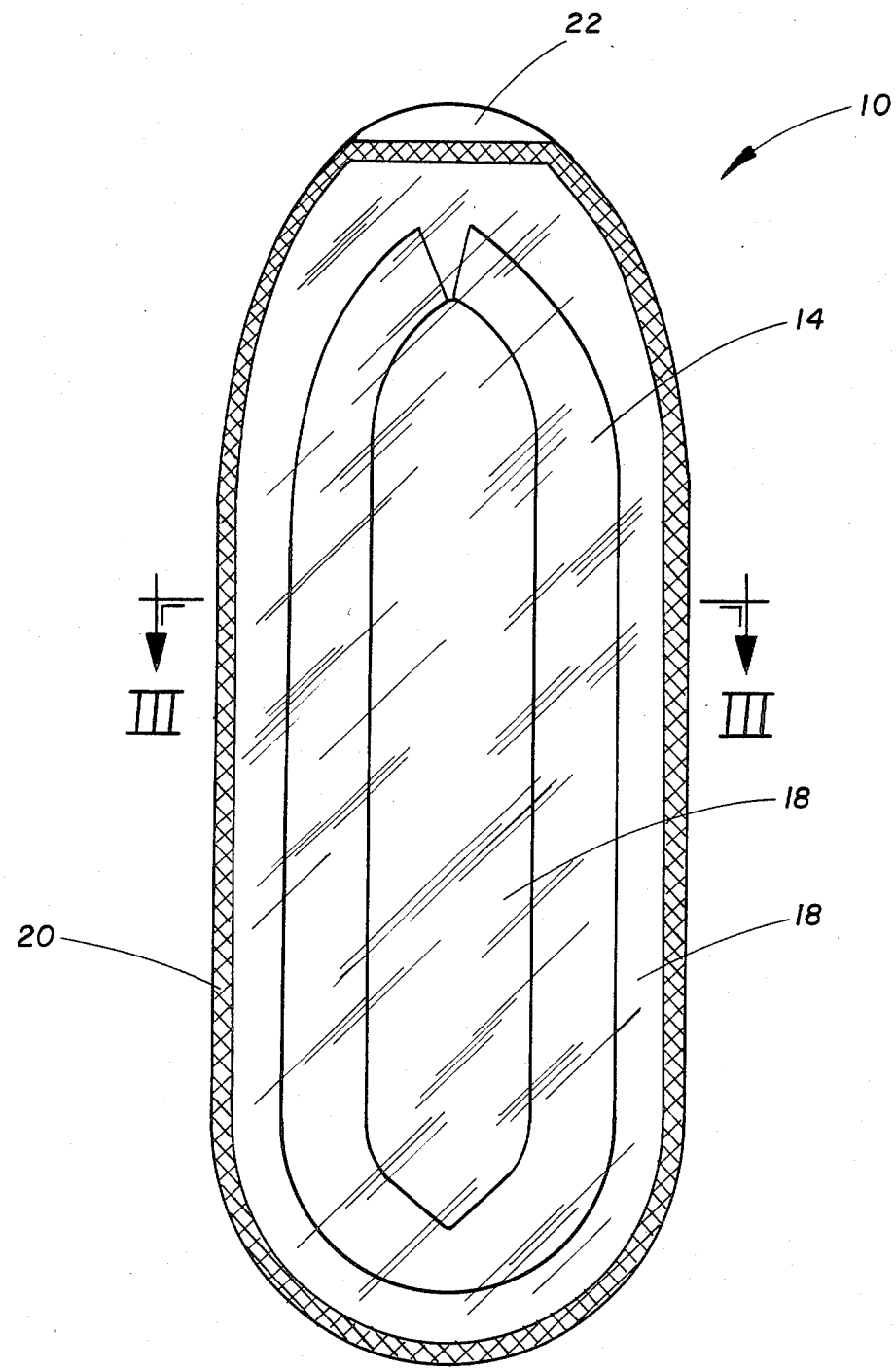
FIG. 1 is a top view of a package which may be made in accordance with the present invention.
Figure 2:
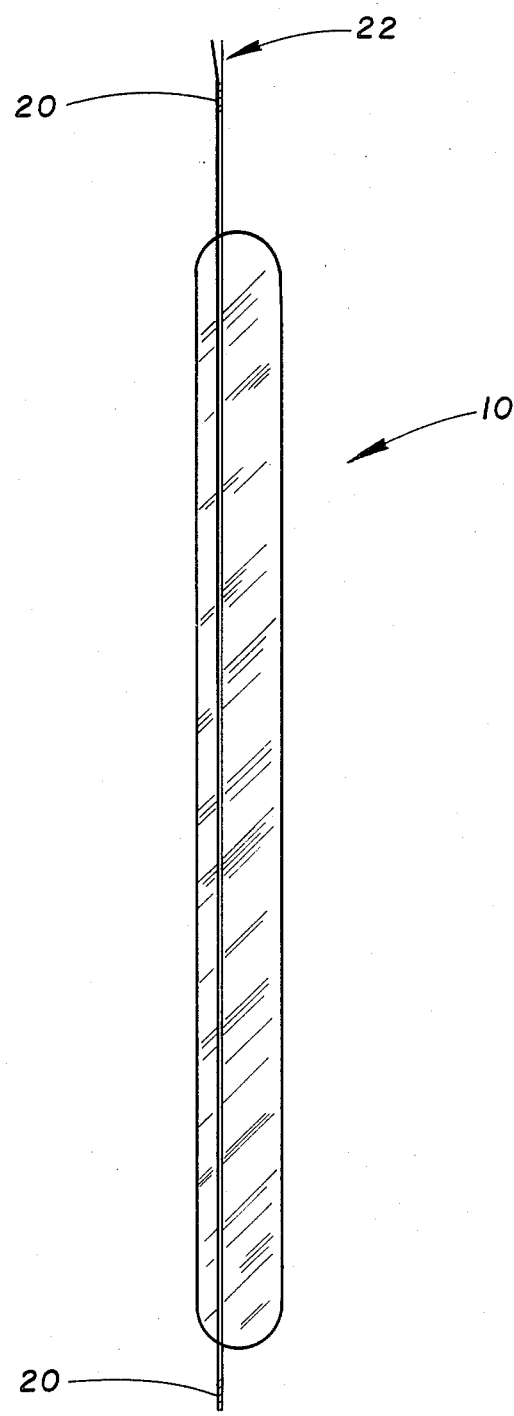
FIG. 2 is a side view of a package made in accordance with the invention.
Figure 3:
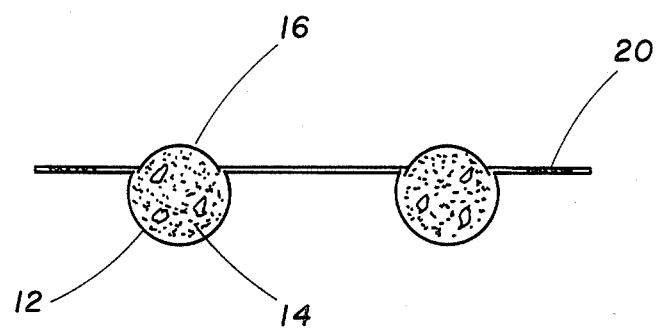
FIG. 3 is a cross-sectional view taken along line III—III of FIG. 1.

"Easily peelable" and like terminology is used herein to refer to a package, and specifically heat-sealed and self-welded area of a package, which are readily peelable without tearing or rupturing the packaging materials which may result in premature destruction of the package and inadvertent contamination of the contents of the package. An easily peelable package is one which can be peeled without resort to a knife or other implement to tear open the package.

"Self-welding" and like terminology is used herein to refer to materials which adhere to each other in a contact seal and will stay welded through normal commercial distribution without external force. This self-adherent or contact weld is maintained by the strength of the weld alone and is not due to any extraneous force pushing the film sheets or package walls together.

"Fusion seal" and like terminology is used herein to denote a seal, for example around the peripheral area of the package, made under heat and pressure and for a sufficient duration of time to fuse the sealing surfaces of the respective webs.

"Ionomer" is used herein to refer to metal salts of ethyleneacrylic or methacrylic acid copolymers having pendent carboxylate groups associated with monovalent or divalent cations such as zinc or sodium.

DETAILED DESCRIPTION OF THE PREFERRED EMBODIMENTS

Referring to the drawings, package 10 has a first web 12 which is a forming web produced by thermoforming or other suitable techniques well known in the art. Suitable thermoforming methods, for example, include a vacuum forming or plug-assist vacuum forming method. In a vacuum forming method, the first web is heated e.g. by a contact heater and a vacuum is applied beneath the web causing the web to be pushed by atmospheric pressure down into a pre-formed mold. In a plug-assist vacuum forming method, after the first or forming web has been heated and sealed across a mold cavity, a plug shape similar to the mold shape impinges on the forming web and, upon the application of vacuum, the forming web transfers to the mold surface.

After the forming web is in place, a product 14 is placed, such as by manual loading, on the forming web and a second, substantially non-forming web 16 is disposed over the product and heated by a heating plate. A release of vacuum causes the web to tack to the forming web so as to enclose the product between the webs and self-weld the first and second webs at their contiguous surfaces. At a sealing station, the package is vacuumized and fusion sealed with a sealing device such as a heated jaw. The first or forming web encloses a substantial portion, generally more than half, of the product to be packaged.

The first and second webs may be made from a shrinkable material i.e. a material which has been oriented such as by stretch orienting and which will shrink about the product upon elevating the temperature of the film or laminate. Thus, the package may be treated by a brief exposure to heat, in the form of hot air or hot water or steam, to shrink the formed laminate around the product to achieve a tight and wrinkle-free package, and also to insure that the sealing surfaces i.e. the self welded areas 18 in contact with each other adhere firmly to achieve excellent clarity and resistance to loss of package vacuum in the event that a packaging material is punctured.

A first or forming web made from unoriented material in accordance with the preferred embodiment of this invention will exhibit shrinkage about the product to be packaged after thermoforming and exposure to hot air or hot water.

After the first and second webs have been self-welded, and preferably before the shrinking operation described above is performed, the peripheral edge of the package is sealed such as by a heating jaw using techniques well known in the art. This peripheral or fusion seal 20 is located at or near the actual periphery of the package. In a preferred embodiment, a portion of the peripheral area around the package is extended, forming an external flap 22 providing a means for easily opening the package. The contiguous surfaces of the first web 12 and second web 14 are not completely sealed in the region of this external flap, thereby facilitating the use of the easy-open mechanism in accordance with the invention by including a convenient means for pulling apart the package.

The laminate of the first or forming web 12 includes a sealant layer comprising a blend or an ethylene vinyl acetate copolymer and an ionomer. The ethylene vinyl acetate copolymer contains preferably between about 6% and 20% vinyl acetate by weight. The ionomer is preferably a zinc ionomer, such as Surlyn 1705 available from DuPont Company, but may be a sodium ionomer as well. The ratio or ethylene vinyl acetate (EVA) to the ionomer may be from about 50% EVA/50% ionomer to about 99% EVA/1% ionomer.

The laminate forming the second, substantially non-formng web 16 likewise includes a sealant surface of an ionomer, and preferably a zinc ionomer such as Surlyn 1702, also available from DuPont Company. The ionomers of the first and second webs may optionally be identical. This ionomer layer on the second web is preferably a relatively thin layer. More preferably the sealant layer has a thickness of between about 0.2 and 0.5 mils, and most preferably about 0.3 mils. The second web also includes a layer adjacent to the ionomer layer of an ethylene vinyl acetate copolymer. A preferable EVA contains between about 2.5% and about 6% vinyl acetate by weight. The ionomer layer and immediately adjacent EVA layer are preferably coextruded.

The easy-open mechanism according to the present invention works as follows. The first and second webs during thermoforming or like process, are self-welded at their contiguous surfaces and enclose the product, such as a ring sausage or other food product. This self-welding occurs under relatively low temperture conditions. Subsequently, a fusion seal is formed at or near the periphery of the package at relatively high temperatures, i.e. at temperatures higher than those involved in the self-welding step.

Figure 4:
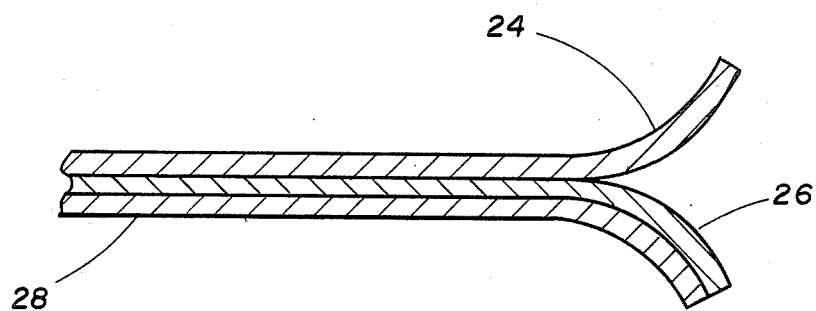
FIG. 4 is a schematic representation of the fusion seal area of the package as peeling is initiated.
Figure 5:
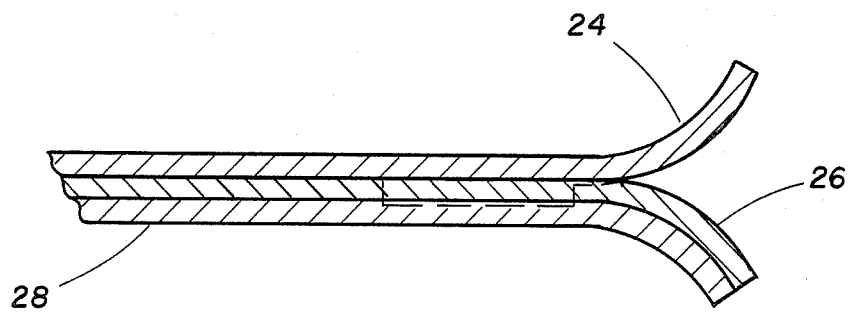
FIG. 5 is a schematic representation of the path of separation of the package during peeling.
Figure 6:
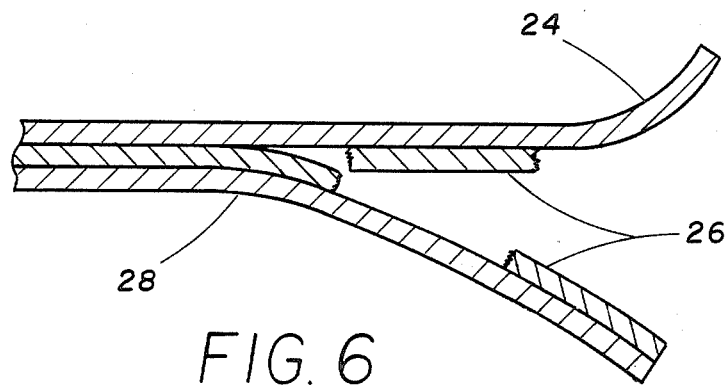
FIG. 6 is a schematic representation of a package after peeling has progressed through the fusion seal area of the package.

Two mechanisms control the easy peelability of the resulting package. (See FIGS. 4–6). The first concerns the adhesion between the sealing layer 24 of the first web 12 and the sealing layer 26 of the second web 16. At the relatively low temperatures encountered during self welding, the first and second webs are firmly adhered to each other at their contiguous surfaces. Upon application of a relatively high temperature in the peripheral area of the package, the sealant layers 24 and 26 of the first and second webs fuse to each other. Thus the EVA/ionomer blend of the first or forming web becomes fused to the ionomer of the second web in the fusion seal area. The second mechanism of interest is the bond between the sealing layer 26 of the second or non-forming blend, and the immediately adjacent EVA layer 28. When the sealing layer 26 is kept relatively thin, preferably between 0.2 and 0.5 mils, and more preferably about 0.3 mils, the bond between sealing layer 26 and the adjacent EVA layer 28 is sufficiently strong to maintain package integrity and avoid delamination during the distribution cycle, yet provide a "tear out" layer when it is desired to open the package. This is made possible because the bond between sealant layer 26 and adjacent EVA layer 28 is weaker in the fusion seal area of the package than the adhesion between sealant layer 26 and sealant layer 24 of the first or forming web. When it is desired to open the package, peeling of the package beginning at the external flap 20 results in the pulling apart of the first and second webs at the interface between sealing layers 24 and 26 up to the point where the fusion seal is encountered. Beginning at this point, and as peeling proceeds, where the first and second webs are fused together, the sealant layer 26 delaminates from the immediately adjacent EVA layer 28 only in the heat-sealed area. Upon further peeling, this delamination results in a "tear-out" as illustrated in FIGS. 5 and 6. After the package undergoes delamination in the fusion seal area, with continued peeling the package will resume opening in the first mode described above, i.e. between the sealant layers 24 and 26 of the first and second web, so that for example in the self-weld area 18 between the product and the fusion seal (See FIG. 1), peeling of the first and second web will once again be controlled by the incompatible sealant surfaces 24 and 26 of the first and second web respectively.

One important attribute of the forming web in accordance with the present invention is that the interlaminar bond strength of the layers making up the forming web must be greater than the adhesive strength of the sealant layers of the first and second webs. This is necessary to limit the possible mechanisms for peeling to those described above, i.e. separation of incompatible sealant layers, or delamination of the ionomer/ethylene vinyl acetate interface of the non-forming web.

For convenience the second web may be referred to as a "non-forming" web, although in fact some forming of the web may be said to take place during a thermoforming or similar process.

A package is thus provided which includes a reliable easy-open feature in a shrinkable laminate package by combining two methodologies; the first dictated by incompatibilities between the sealant layers of the forming and non-forming webs, and the second provided by controlled delamination of the sealing layer and immediately adjacent EVA layer in the non-forming web.

In a more preferred embodiment, the first or forming web comprises a first layer of polypropylene, a second or tie layer, a third layer of a blend of linear low density polyethylene and ethylene vinyl acetate copolymer, a fourth or tie layer, a fifth or barrier layer of ethylene vinyl alcohol copolymer, a sixth or tie layer, a seventh layer of a blend of linear low density polyethylene and ethylene vinyl acetate copolymer, and an eighth or sealant layer of a blend of ethylene vinyl acetate copolymer and an ionomer.

The second or non-forming web preferably comprises a first layer of nylon, a second layer of an adhesive, a third layer of ethylene vinyl acetate copolymer, and a fourth or sealant layer of an ionomer. The second or non-forming web may also include a layer or vinylidene chloride/vinyl chloride copolymer.

In another preferred embodiment, the second or non-forming web may comprise a first layer of polypropylene, a second or tie layer, a third layer of ethylene vinyl acetate copolymer, a fourth or tie layer, a fifth layer of ethylene vinyl alcohol copolymer, a sixth or tie layer, a seventh layer of ethylene vinyl acetate copolymer, and an eighth or sealant layer of an ionomer.

The first or forming webs as described above is preferably produced by coextrusion, by means well known in the art.

The second or non-forming web may be produced by lamination as in the embodiment described above using nylon and an adhesive; or alternatively may be coextruded as in the second embodiment above including the first layer of polypropylene and subsequent layers.

The preferred embodiment of the first or forming web has a polypropylene layer of preferably about 0.20 mils thickness; a second or tie layer of about 0.40 mils; a third layer of a blend of linear low density polyethylene and ethylene vinyl acetate copolymer of about 1.00 mils; a fourth or tie layer of about 0.30 mils; a barrier layer of about 0.45 mils; a sixth or tie layer of about 0.30 mils; a seventh layer of a blend of linear low density polyethylene and ethylene vinyl acetate copolymer of about 1.00 mils; and a sealant layer of a blend of ethylene vinyl acetate copolymer and an ionomer of about 0.85 mils.

The second or non-forming web in its first preferred embodiment described above has the following preferred thicknesses: in the first or nylon layer, about 0.75 mils; in the second or adhesive layer, about 0.08 mils; in the third layer of ethylene vinyl acetate copolymer, about 1.75 mils; and in the sealant layer, about 0.25 mils.

In the second preferred embodiment of the second or non-forming web described above, the first layer of polypropylene has a thickness of about 0.50 mils. The second or tie layer has a thickness of about 0.20 mils; the third layer of EVA, about 0.65 mils; the fourth or tie layer, about 0.20 mils; the fifth layer of ethylene vinyl alcohol copolymer, about 0.35 mils; the sixth or tie layer, about 0.20 mils; the seventh layer of EVA, about 0.60 mils; and the eighth or sealant layer, about 0.35 mils.

In the preferred embodiments, the first or forming web has a first layer of polypropylene. A suitable polypropylene is available from Northern Petrochemical Co. and marketed as Norchem NPP 2085GW. The second layer is an adhesive and may be a terionomer such as an ethylene vinyl acetate-based proprietary resin available from DuPont as CXA E162. The third layer is a blend of preferably about 40% linear low density polyethylene such as DOWLEX 2045 available from Dow Chemical Co. The other part of the blend of the third layer is preferably about 60% of an ethylene vinyl acetate copolymer, more preferably an EVA of about 9% vinyl acetate content, such as LD-318.92 EVA resin available from Exxon Chemical. The fourth or adhesive layer is preferably an adhesive such as that used in the second layer. The fifth or barrier layer is ethylene vinyl alcohol copolymer. A suitable example is EVAL EC-F101 available from EVAL Company of America. The sixth or adhesive layer is preferably the same as that utilized in the second and fourth layers. The seventh layer is a blend of linear low density polyethylene and ethylene vinyl acetate preferably similar to the blend utilized in the third layer. The eighth or sealant layer is a blend of ethylene vinyl acetate and an ionomer. The ethylene vinyl acetate component of the sealant layer of this first or forming web is present preferably from about 50% to about 99% of the sealant layer by weight. Conversely, the ionomer is present in a range preferably from about 1% to about 50% by weight of the total weight of the sealant layer. More preferably, the ethylene vinyl acetate component of the sealant layer of the first or forming web is present in the amount of between about 90 and 95% of the total weight of the sealant layer, and conversely, the ionomer is present in the range preferably from about 5 to 10% by weight of the total weight of the sealant layer. Surprisingly, a forming web with 95% EVA and 5% of a zinc ionomer was found to have considerably stronger seal strength than samples with 90% EVA and 10% ionomer. The ionomer is more preferably a zinc ionomer. A suitable example is Surlyn 1705 available from DuPont Company.

The second or substantially non-forming web includes a first layer of nylon and preferably nylon 6. More preferably, a cast nylon with one side coated with saran is utilized. A suitable example is Capran 77K nylon available from Allied Corporation. The second or adhesive layer is represented for example by Korolam Adhesive 880X301 available from DeSoto. The third layer is an ethylene vinyl acetate copolymer, preferably an EVA with an vinyl acetate content of about 3.5%. A suitable resin is PE204-CS95 copolymer EVA resin available from El Paso Products Co. The fourth or sealant layer comprises an ionomer, and more preferably a zinc ionomer, which is not the same ionomer as that utilized in the sealant layer of the first or forming web. A suitable ionomer is Surlyn 1702 available from DuPont Company. In an even more preferred embodiment, the sealant layer of the second or substantially non-forming web includes between about 2% and 4% of an anti-block agent such as Conpol 8750 available from the DuPont Company.

In an alternate embodiment, the second or substantially non-forming web includes a first layer of polypropylene such as that described above for the forming web, a second or tie layer such as that described above for the forming web, a third layer of ethylene vinyl acetate copolymer preferably of about 3.5% vinyl acetate content by weight, such as for example the PE204-CS95 copolymer EVA resin; a fourth or tie layer, preferably as in the second layer; a fifth layer of ethylene vinyl alcohol copolymer such as that described above for the first or forming web; the sixth or tie layer, preferably as in the second and fourth layers; a seventh layer of ethylene vinyl acetate copolymer, preferably similar to that in the third layer; and an eighth or sealant layer of an ionomer, more preferably a zinc ionomer, and representatively Surlyn 1702.

The presence of between about 2 and 4% of an anti-block concentrate in the ionomer layer of one embodiment of the second or substantially non-forming web assures that wrinkling and tackiness of the sealant layer during extrusion and specifically during bubble collapse is substantially avoided. A secondary benefit in using small amounts of anti-block in the ionomer layer is that the package flap 22 used for peelable seals is easy to open.

The first or forming web according to the present invention has excellent formability, shrink characteristics, optics, and openability. Additionally, the forming web does not delaminate during opening.

The forming web is also characterized by insignificant melt rippling after thermoforming and shrinking of the package about the product.

EXAMPLE 1

Example 1 is one of the preferred easy open laminates in accordance with the present invention. The laminate used as a forming web comprised a first layer of polypropylene (NPP 8080 from Northern Petrochemical Company); a second adhesive layer (CXA E152 from DuPont); a blend of 40% linear low density polyethylene (DOWLEX 2045) and 60% ethylene vinyl acetate copolymer (LD-318.92 EVA resin with 9% vinyl acetate content); a fourth or barrier layer of ethylene vinyl alcohol copolymer (EVAL EC-F101); another adhesive alyer as in the second layer; another blend layer as in the third layer; and a sealant layer comprising a blend of 90% ethylene vinyl acetate copolymer (3130SB from DuPont with a 9% vinyl acetate content) and 10% ionomer (Surlyn 1705).

Laminate was placed on a thermoforming machine and the forming temperature was varied from 70° to 90° C. The sealing range was varied from 90° to 110° C. A non-forming web used in conjunction with the forming web comprised a first layer of a cast nylon 6 with one side coated with saran; an adhesive layer of Korolam adhesive 880X301; a third layer of ethylene vinyl acetate copolymer with a 3.5% vinyl acetate content (PE204-CS95); and a sealant layer of 98% ionomer (Surlyn 1702) and about 2% of an anti-block agent (Conpol 8750).

The forming web had a thickness of about 4.5 mils.

It was found that upon thermoforming, the forming web had good optical properties with excellent clarity, and that melt rippling was no longer detectable after forming and shrink. The forming web formed well in a temperature range of about 75° to 90° C. with good pocket depth. This material also exhibited excellent shrink, and a good easily peelable heat seal within a temperature range of about 5° C. The forming web did not exhibit any delamination.

Sample packages made from the forming and non-forming webs described above also showed adequate seal strengths and inner ring self-welding. Sample packages were packages enclosing a smoked ring sausage product. Only minor curling of the top (non-forming) web was observed, so that the non-forming web remained relatively flat.

EXAMPLE 2

A similar combination of materials was used as shown in Example 1. The materials were identical in all respects except that the sealant layer of the forming web comprised a blend of 95% ethylene vinyl acetate copolymer and 5% ionomer.

Sample packages showed and excellent easy-open peelability over an approximately 5° C. range of sealing temperatures. Suprisingly, although the forming web had a lower percentage of ionomer in the sealant layer than in Example 1, considerably stronger fusion seals were obtained than the sample of Example 1.

No delamination of the forming web was evidenced during peeling of the package.

EXAMPLE 3

A laminate structure was tested which included the following formulation:

A first or outer layer comprised polypropylene (NPP 2085 GW) available from Northern Petrochemical Company; a second layer of polypropylene homopolymer (NPP 2000 GJ) also available from Northern Petrochemical Company; a third or tie layer as in Examples 1 and 2; a fourth or barrier layer of ethylene vinyl alcohol copolymer as in Examples 1 and 2; a fifth or tie layer as in Examples 1 and 2; a sixth layer of polyprolylene (NPP 2000 GJ); a seventh or tie layer as in Examples 1 and 2; and an eighth or sealant layer in Examples 1 and 2.

This laminate provides excellent moisture vapor barrier properties; improved shrink properties; good mechanical strength, and clarity. It also permits higher temperature ranges for processing of the laminate during thermoforming and subsequent shrink steps. In a seal test, for a one inch strip of material, at 250° F., seal values of 3.53, 3.0, and 3.0 pounds were obtained in three tests using a Scott tester.

EXAMPLE 4

A laminate was tested and comprised a first or outer layer or polypropylene homopolymer (NPP 2085 GW); a second layer of ethylene propylene copolymer (NPP 3303 GK) available from Northern Petrochemical Company; a third or tie layer as in previous Examples; a fourth or barrier layer as in previous Examples; a fifth or tie layer as in previous Examples; a sixth layer of ethylene propylene copolymer as in the second layer; a seventh tie layer; and a sealant layer as in previous Examples for the forming web.

This laminate also has improved moisture vapor barrier and shrink properties, as well as improved mechanical strength, clarity, and higher temperature range for processing.

Although in the preferred embodiments the blend of EVA and ionomer is shown in the sealant layer of the forming web, and an ionomer is shown in the sealant layer of the second or non-forming web, these compositions may be reversed. Thus, the forming web could include a sealant layer of an ionomer, preferably a zinc ionomer of ethylene, and the non-forming web could include a sealant layer having a blend of EVA and an ionomer. In this event, the sealant layer containing the ionomer alone (not the blend) would be very thin, preferably 0.2-0.5 mils, and would have an adjacent layer containing ethylene vinyl acetate copolymer, thereby providing the "tear-out" mechanism described above.

A package made in accordance with the present adventure is especially suitable for the packaging of food products such as ring sausage and smoked ring sausage.

While the invention has been described by way of example, various modifications may be made by those skilled in the art without departing from the scope of the invention.

What is claimed is:

1. An easily peelable thermoplastic package comprising:
   (a) a first web including a sealant layer comprising a blend of ethylene vinyl acetate copolymer and an ionomer;
   (b) a second web including a sealant layer consisting of an ionomer, and which can include minor amounts of an anti-block agent; and
   (c) the first and second webs adhering at their contiguous surfaces and enclosing an article.

2. A package according to claim 1 wherein the first web comprises:
   (a) a first layer of polypropylene;
   (b) a second or tie layer;
   (c) a third layer of a blend of linear low density polyethylene and ethylene vinyl acetate copolymer;
   (d) a fourth or tie layer;
   (e) a fifth or barrier layer of ethylene vinyl alcohol copolymer;
   (f) a sixth or tie layer;
   (g) a seventh layer of a blend of linear low density polyethylene and ethylene vinyl acetate copolymer; and
   (h) an eighth or sealant layer of a blend of ethylene vinyl acetate copolymer and a zinc ionomer.

3. A package according to claim 1 wherein the second web comprises:
   (a) a first layer of nylon;
   (b) a second layer of an adhesive;
   (c) a third layer of ethylene vinyl acetate copolymer; and
   (d) a fourth or sealant layer of a zinc ionomer.

4. A package according to claim 1 wherein the second web comprises:
   (a) a first layer of polypropylene;
   (b) a second or tie layer;
   (c) a third layer of ethylene vinyl acetate copolymer;
   (d) a fourth or tie layer;
   (e) a fifth layer of ethylene vinyl alcohol;
   (f) a sixth or tie layer;
   (g) a seventh layer of ethylene vinyl acetate copolymer; and
   (h) an eighth or sealant layer of a zinc ionomer.

5. An easily peelable package according to claim 1 wherein the first or forming web comprises:
   (a) a first or outer layer of polypropylene;
   (b) a second layer of polypropylene;
   (c) a third or tie layer;
   (d) a fourth or barrier layer of ethylene vinyl alcohol copolymer;
   (e) a fifth or tie layer;
   (f) a sixth layer of polypropylene;
   (g) a seventh or tie layer;
   (h) an eighth or sealant layer of a blend of between about 50 and 99% by weight of ethylene vinyl acetate copolymer, and between about 50 and 1% by weight of an ionomer.

6. An easily peelable package, as in claim 1, wherein the first or forming web comprises:
   (a) a first or outer layer of polypropylene;
   (b) a second layer of ethylene propylene copolymer;
   (c) a third or tie layer;
   (d) a fourth or barrier layer of ethylene vinyl alcohol copolymer;
   (e) a fifth or tie layer;
   (f) a sixth layer of ethylene propylene copolymer;
   (g) a seventh or tie layer;
   (h) an eighth or sealant layer of a blend of between about 50 and 99% by weight of ethylene vinyl acetate copolymer, and between about 50 and 1% by weight of an ionomer.

7. The package according to claim 1 wherein the sealant layer of the second web has between about 2% and 4% by weight of the sealant layer of an anti-block agent.

* * * * *